May 2, 1933.   O. RICHTER   1,906,719

GYRO-PENDULUM

Filed April 10, 1929

Inventor
Oskar Richter
BY Pennie, Davis, Marvin & Edmonds
Attorneys

Patented May 2, 1933

1,906,719

UNITED STATES PATENT OFFICE

OSKAR RICHTER, OF KIEL-NEUMUHLEN, GERMANY, ASSIGNOR TO NEDERLANDSCHE TECHNISCHE HANDEL MAATSCHAPPIJ "GIRO" IN DEN HAAG

GYRO-PENDULUM

Application filed April 10, 1929, Serial No. 354,159½, and in Germany April 12, 1928.

My invention relates to a gyro-pendulum and, more particularly, to a gyroscopic instrument adapted to give indication of lateral inclinations of a vehicle upon which the instrument is mounted. The primary object of my invention is an instrument of the afore-mentioned character which is not liable to be affected by accelerations in the direction of travel.

It is known to use gyroscopes with a generally vertical axis for indicating the obliquity of the support, for example a vehicle. In an arrangement usually resorted to for the purpose in view, the gyroscope carrier in which the bearings of the gyroscope axle are located, is so mounted as to be swingable about its three principal axes and to tend, under the action of gravity, to assume a definite normal position relative to the horizon. As an example, the carrier may be suspended on gimbal rings so that the common centre of gravity of itself and of the gyroscope is situated somewhat below the point of intersection of the pivots of the gimbal ring which are substantially horizontal in the position of rest, whereby the axis of the gyroscope tends to assume the vertical position under the action of gravity.

When this arrangement is used on a moving railway vehicle to determine the super elevation of the track on curves or to ascertain whether the rails are on the same level on straight portions of track, the gyroscope is detrimentally affected by lateral accelerations owing to a change in the speed or in the direction of motion. Also, the gyroscope is subject to displacement during a retardation or deceleration of the vehicle, such as when braking about the pivot of the gimbal ring in conformity with known laws, and the gyroscope reacts by moving precessionally about the gimbal ring axis. Deflections of the gyroscope which are due to a lateral inclination of the vehicle, however, are of the same order so that it is impossible to discern whether the deflection is due to a change in speed or to a difference in level of the rails (in case of a railroad vehicle) the detection of which is one of the objects of my invention.

In another form or type of inclinometer, the gyroscope is resiliently supported in and connected to a pendulous or other means sensitive to gravity, so that inclination of the body upon which the inclinometer is mounted causes the resilient connection to induce precession of the gyroscope in response to the inclination, but in this arrangement the gyroscope is also sensitive to accelerations and decelerations of the vehicle so that the effect of actual tilting of the vehicle cannot be distinguished from acceleration and deceleration effects thereof.

It may be thought that the error would be kept within small limits by placing the centre of gravity very high, but a simple and rough calculation will show that the error becomes unduly great even if the centre of gravity is situated at the shortest possible distance from the centre of suspension, determined by the necessity of allowing the axis of the gyroscope to settle in the vertical position with sufficient accuracy.

I have found that the undersirable influence of accelerations in the direction of travel may be eliminated in a satisfactory manner by the provision of means permitting the center of gravity to be disposed on that axis of oscillation of the gyroscope carrier which is transverse to the direction of travel.

Such means comprise suitable contrivances co-ordinated to the base of the instrument and resiliently tending to keep the gyroscope axle in the vertical plane transverse to the direction of travel.

Three embodiments of my invention are illustrated in the drawing, in which

Figure 1:
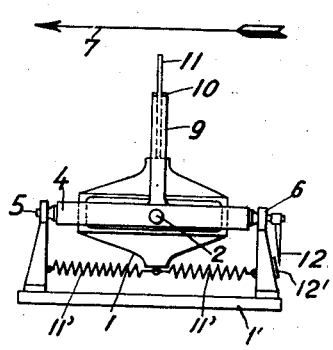
Fig. 1 illustrates in elevation one form of the gyro-pendulum of this invention.

In the drawing, the gyroscope carrier or casing and its contents are neutrally mounted as regards earth and other accelerations. The carrier of the gyroscope in the form of a casing 1 has pivots 2 and 3 rigidly connected thereto, and rotatably mounted in the gimbal ring 4, which in turn is rotatably mounted on diametral pivots 5 and 6 mounted on the frame 1', which is rigidly secured to the vehicle, whose lateral inclination the inclinometer is adapted to indicate. The center of gravity of the carrier 1 and its contents, however, is situated on the axis of the pivots 2, 3. The gimbal ring 4 is weight-loaded so that, in oscillating about the axis 5—6 it tends to keep the axis 2—3 horizontal in the position of rest. The gyroscope being neutrally mounted about the axis 2—3, provisions must be made to prevent the axis of the gyroscope from tipping over within the direction of motion. As may be seen from Fig. 1, the gimbal ring 4 is provided with an integral yoke 9 having a small hole 10 at its uppermost point. This hole is engaged by a very elastic steel wire or rod 11 secured coaxially to the gyroscope carrier and providing a smooth and resilient connection between the yoke 9 and the gyroscope axle. Obviously, however, any resilient means will serve the purpose which tends to keep the gyroscope axle within the plane transverse to the direction of travel. For example, in Fig 2, coil springs 11' are indicated which extend from the lowermost point of the carrier 1' to the brackets supporting the pivots 5' and 6', and have an effect similar to the wire or rod 11 in the arrangement of Fig. 1 in that they counteract any departure of the gyroscope axle from the transverse plane.

Figure 2:
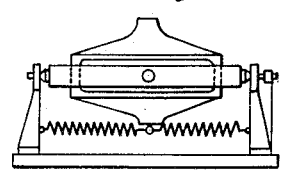
Fig. 2 illustrates in elevation a modified form of the new gyro-pendulum.

It may be clearly seen from Fig. 1 that all accelerations in the direction of travel indicated by the arrow 7 have no tendency to swing the axle of the gyroscope and have, therefore, no effect on the position of the axle of the gyroscope. Of course, the position of the said axle relatively to the truly vertical transverse plane now depends from the angle formed by the rails (taken in the direction of motion) with the horizontal; in other words, the said position is dependent upon the gradients of the track. This subordination of gradients is however the smaller evil because firstly these angles are considerably smaller than the changes in the apparent direction of gravity owing to accelerations in the direction of motion mentioned in the foregoing; secondly the transitions from one gradient angle to the other are considerably smoother than the variations in speed and therefore produce much smaller errors of indication than the latter; finally, it is practically immaterial for the determination of the angle of superelevation whether or not the axle of the gyroscope is accurately in the transverse vertical plane, as a deviation from this plane has no influence on the indications to be observed. The latter are given, in the embodiment shown, by means of pointer 12 mounted on the pivot 6 (Fig. 3) and a suitable scale 12' mounted on the base 1'.

The principle underlying the invention consists in that any acceleration pressure within the longitudinal vertical plane which, with the constructions prior to my invention, would have a disturbing effect causing turns of the gyroscope axle in the transverse vertical plane (owing to gyroscope precession) is neutralized by substitution of spring constraint for gravity constraint, as far as turns about the horizontal transverse axis are concerned. The precession-curve of the end of the gyroscope axle forms a circle, or an ellipse having similar main axes, if the degree of constraint exerted by the spring is properly selected, i. e. if it is of the same order as the contraint exerted by the weight of the gimbal ring 4, so that the settling-down oscillations may be damped with known means (not shown).

Figure 3:
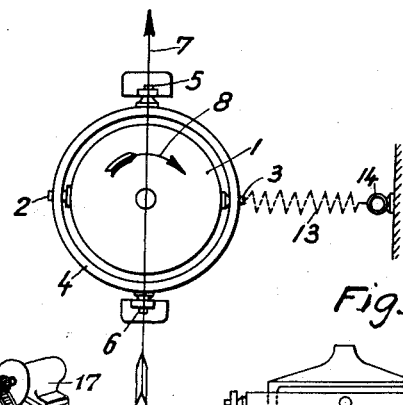
Fig. 3 illustrates in plane another modified form of the invention.

It is in no way a material requirement of my invention that the turns of the gyroscope axle in the transverse vertical plane are counteracted by gravity effect, e. g. by the weight of the ring 4. Also in this instance, the action of a spring may be used instead of that of a weight. Fig. 3 shows a helical spring 13 in dotted lines, one end of the said spring being attached to the gimbal ring 4 in the vicinity of the pin 3 and the other to an upright 14 rigidly connected to the support of the gyroscope, so that the spring 13 tends to keep the gimbal ring 4 horizontal in the normal position of rest. The springs 11' shown in Fig. 2 have a similar effect. As, in this embodiment, the center of gravity of the gyroscope and its casing 1 is situated on the axis of the pivots 2, any lateral acceleration pressure such as will ocur when the vehicle is running around curves, is without effect. The variations in the angle of superelevation will be correctly indicated notwithstanding unavoidable deviations of the pull of spring 13 from the true horizon, because the precessional movement produced by such pulls of the spring which are due to superelevations, do not take effect initially in the transverse plane used for determination purposes; the evolution of these movements is generally so slow that they have no disturbing action. In these cases the measurements or readings have consequently a slowly changing zero line; however, the individual deviations due to the superelevations to be measured nevertheless stand out clearly from the above-described values because their progress is much more rapid.

Figure 4:
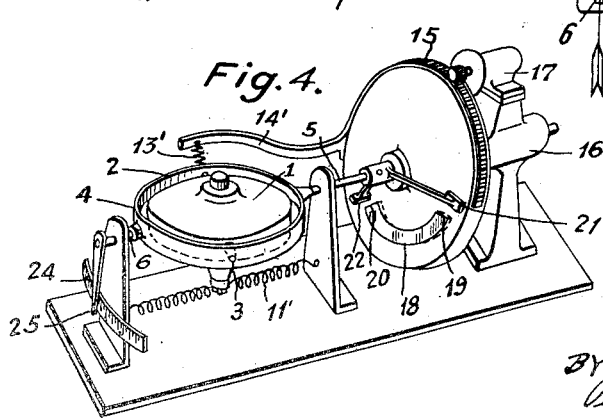
Fig. 4 represents a perspective view of a third embodiment.

This defect may also be eliminated by rendering the point 14 independent of the temporary transverse obliquity of the floor of the vehicle. To this end, it is merely necessary to provide a follow-up device about the axis 5—6; such an arrangement is shown in Fig. 4. The center of gravity of casing 1 with the gyroscope enclosed therein coincides with the point of intersection of the axis of the pivots 5, 6 with that of the pivots 2, 3. Springs 11' extending from the lowermost point of casing 1 to suitable points on the brackets serve to resiliently keep the gyroscope axle within the vertical plane transverse to the direction of travel indicated by the arrow.

In this embodiment, a follow-up arrangement is provided to keep spring 13' truly horizontal. The arrangement comprises a toothed disc 15 rotatably mounted on the pivot 5 and in driving connection with an electro-motor 17. The disc carries an arm 14' affording a point of attachment to spring 13' and is provided with a suitable segment-shaped conductive layer 18 which is connected to a suitable source of current in a manner not shown in the drawing. Two brushes 21 and 22 in contact with the face of disc 15 are mounted on arms attached to pivot 5 and form part of electric circuits of the electro-motor 17 either of which when energized operates the same in opposite directions. A follow-up system of the type which can be utilized for controlling motor 17 is illustrated in Patent No. 1,092,816.

The operation is as follows: Assumed, the vehicle upon which the instrument is installed runs over a section of the track in which one of the rails is at a higher level than the other. The scale 24 mounted on one of the brackets is correspondingly turned about the axis of the pivots 5, 6 while the hand 25 attached to the pivot 6 retains its vertical position owing to the moment of inertia produced by the gyroscope and, consequently, gives a correct indication of the superelevation of the one rail.

At the same time, the disc 15 is tilted by a corresponding amount thereby causing one of the brushes, say brush 22, to make contact with the layer 18. Owing to this contact, the electro-motor 17 is started in a direction in which it operates to move arm 14' towards the base plate thus counteracting the effect of the superelevation on arm 14' which, as result, is restored to truly horizontal position. The circuit of motor 17 is interrupted when disc 15 and arm 14' have reached their normal position relative to ring 4 shown in the drawing.

In this case the point of attachment of the spring 13' is disposed on the follow-up part 14' which has, preferably, its weight so distributed that when the motor is out of operation the said part places the arm 14' in the horizontal plane of the gyroscopic apparatus, while the position of the said follow-up part relatively to the floor of the vehicle is the same as that of the ring 4 when the motor is in operation. The gyroscope is then free from the influence of forces about the axis 5—6 when the follow-up motor rotates, but is directly subjected by the pull of the spring 13' to the action of gravity and of lateral accelerations when the follow-up motor is out of operation so that the arm 14' may freely oscillate about the axis 5—6.

While the invention has been described as especially applicable for indicating the tilt of a vehicle without being subject to acceleration or deceleration thereof, the invention may be used with equal facility for other purposes to which it may be applicable.

What I claim is:

1. In a gyro-pendulum, the combination of a single gyroscope having a normally vertical axis of rotation, a gimbal suspension for said gyroscope having normally horizontal axes, means supporting said gimbal suspension and a yoke on the gimbal suspension, and a resilient member substantially aligned with the gyroscope axis and connecting the gyroscope to the yoke for opposing movement of said gyroscope axis out of the vertical plane.

2. In a gyro-pendulum, the combination of a single gyroscope having a normally vertical axis of rotation, a gimbal suspension for said gyroscope having normally horizontal axes, means supporting said gimbal suspension, and a yoke mounted on the gimbal suspension and extending over the gyroscope, and a spring rod aligned with the gyroscope axis and connected to the yoke for opposing movement of said gyroscope axis out of vertical plane.

3. In a gyro-pendulum, the combination of a single gyroscope having a normally vertical axis of rotation, a gimbal suspension for said gyroscope having normally horizontal axes, means supporting said gimbal suspension, electrical contact means connected to said suspension and displaced thereby as the gyroscope tilts laterally, second contact means mounted on said supporting means and cooperating with said first contact means and displaceable relatively thereto, said contact means normally lying in non-current transmitting relation, and an electric motor energized by displacement between said contact means upon lateral inclination of said gyroscope for restoring said second contact means to non-current transmitting relation with said first contact means.

4. In a gyro-pendulum, the combination of a gyroscope having a normally vertical axis of rotation, a support, a gimbal suspension for the gyroscope mounted on the support, and a resilient member substantially aligned with the axis of the gyroscope connecting the latter to the support for holding the gyroscope axis substantially vertical.

In testimony whereof I have affixed my signature.

OSKAR RICHTER.